United States Patent [19]
Channing

[11] Patent Number: 5,887,572
[45] Date of Patent: Mar. 30, 1999

[54] PRESSURE AND TEMPERATURE CONTROL FOR FUEL DELIVERY SYSTEMS

[75] Inventor: Derek Albert Channing, Livonia, Mich.

[73] Assignee: Ford Global Technologies, Inc., Dearborn, Mich.

[21] Appl. No.: 851,235

[22] Filed: May 5, 1997

[51] Int. Cl.⁶ .................................................. F02M 37/04
[52] U.S. Cl. ........................................... 123/514; 123/510
[58] Field of Search ................................... 123/514, 510, 123/497, 456, 509, 541, 516

[56] References Cited

U.S. PATENT DOCUMENTS

| | | |
|---|---|---|
| 3,973,536 | 8/1976 | Zelders . |
| 4,187,813 | 2/1980 | Stumpp . |
| 4,231,342 | 11/1980 | Johnston . |
| 4,454,848 | 6/1984 | Duprez ..................................... 123/514 |
| 4,478,197 | 10/1984 | Yasuhara .................................. 123/514 |
| 4,574,762 | 3/1986 | Miller et al. . |
| 4,617,116 | 10/1986 | Seiler ....................................... 123/514 |
| 4,618,417 | 10/1986 | Yamanouchi et al. . |
| 5,078,167 | 1/1992 | Brandt et al. . |
| 5,195,494 | 3/1993 | Tuckey ..................................... 123/510 |
| 5,269,276 | 12/1993 | Brown . |
| 5,284,120 | 2/1994 | Fukushima .............................. 123/510 |
| 5,584,318 | 12/1996 | Brandt . |
| 5,623,907 | 4/1997 | Cotton ..................................... 123/497 |
| 5,649,561 | 7/1997 | Brandt . |
| 5,685,278 | 11/1997 | Bradford . .............................. 123/514 |

FOREIGN PATENT DOCUMENTS

| | | |
|---|---|---|
| 3427396 A1 | 7/1984 | Germany . |
| 33 03 587 A1 | 8/1984 | Germany . |
| 2 158 150 | 3/1985 | United Kingdom . |

*Primary Examiner*—Carl S. Miller
*Attorney, Agent, or Firm*—Neil P. Ferraro

[57] ABSTRACT

A control system for a fuel delivery system regulates fuel pressure on the filtered side of a fuel filter and relieves excessive primary pump flow from the unfiltered side of the filter. The valve also selectively provides warm fuel to de-wax the fuel filter after a cold start. Once wax build-up is no longer an issue, the warm fuel is directed to a fuel cooler or a heat sink, such as the fuel tank. The control system prioritizes the maintenance of filtered fuel pressure over maximizing fuel returned for cooling. Also, the fuel filter is protected from excessive fuel pressure differential.

17 Claims, 4 Drawing Sheets

PRESSURE AND TEMPERATURE CONTROL FOR FUEL DELIVERY SYSTEMS

FIELD OF THE INVENTION

The present invention relates to fuel pressure and temperature control in fuel delivery systems for an internal combustion engine, and, more particularly to pressure and temperature control valves for diesel fuel delivery systems.

BACKGROUND OF THE INVENTION

The trend toward reduced emissions, as well as increased demand for improvement in fuel economy, has resulted in significantly increased fuel injection pressures. This trend has also led to the use of electronic controls, which provide precise fuel metering and injection timing. Accordingly, conventional fuel delivery systems for high fuel pressure applications, such as diesel fuel systems, typically include a high pressure fuel injection pump or system, which controls fuel injection rate, quantity and timing, to deliver fuel to an engine, via fuel injectors. These fuel delivery systems may also include a primary low pressure pump, which draws fuel from a fuel tank and delivers fuel to the fuel injection system, via a fuel filter.

The fuel injection pump used in these high pressure applications typically includes a means for venting fuel at the end of injection, or a means for venting fuel from a high pressure accumulator. The work done in pressurizing the fuel is not recovered in the venting process, resulting in an increase in fuel temperature. Also, the supply fuel is used for cooling the electronic components, which further increases the fuel temperature. The engine will also contribute toward heating the fuel.

Heated fuel is returned to the fuel filter or fuel tank via a fuel return line. If the heat in the returned fuel is excessive, a fuel cooler may also be required to prevent heat build up in the fuel tank, therefore limiting the fuel injection pump supply temperature. Excessive fuel injection pump supply temperature would not adequately cool the electronics and the less viscous fuel would not adequately lubricate the close clearance parts of the injection system. Because self regulating diaphragm pumps may not provide adequate fuel flow for total system cooling, the primary fuel pump used in these prior art systems is usually electrically driven and requires external pressure and flow regulation via a pressure regulator.

Further, it is well known that when diesel fuel is at low temperatures approaching the cloud point, paraffin wax crystals will form. To prevent wax choking of the filter after a cold start, electric fuel filter inlet heaters are used in some prior art fuel delivery systems. Because newer diesel injection systems also have higher fuel supply and return flow for system cooling, the size of the electric heater becomes too large to have an adequate de-waxing effect on the increased supply fuel flow. Therefore, it may be desirable to divert warm fuel from the injection system to the unfiltered side of the filter to de-wax the filter after a cold start.

With respect to controlling fuel pressure, the inventor of the present invention has found certain disadvantages with these prior art fuel delivery systems. For example, pressure regulation is performed either completely on the filtered side of the fuel filter (where the pressure regulator senses fuel pressure on the filtered side of the fuel filter and bypasses excess filtered fuel), or completely on the unfiltered side of the fuel filter (where the pressure regulator senses the fuel pressure on the unfiltered side of the fuel filter and bypasses excess unfiltered fuel). Filtered side regulation causes excess flow through the filter element, which increases the pressure drop, reduces the service life and adversely reduces the wax build-up time during cold starts. Unfiltered side pressure regulation causes the fuel pressure on the filtered side of the filter to vary, depending upon the fuel flow through the filter, as dictated by engine demand as well as manufacturing variation of the filter, and service life of the filter.

With respect to fuel temperature control, the inventor of the present invention has found that prior art direct acting temperature controlled diverter systems, which are used to selectively divert warm fuel to the fuel filter to de-wax the fuel filter during cold start, or to the fuel cooler or fuel tank after a cold start, generally do not accommodate the high injection pump return fuel flow of modern fuel injection systems. Further, in certain situations where the primary pump cannot meet the return flow requirements of the fuel injection system, it may be desirable to prevent loss in fuel pressure, by overriding the temperature controlled diverter system, such that some warm fuel is returned to the injection system, rather than the fuel cooler or fuel tank, thereby prioritizing fuel pressure maintenance.

The inventor of the present invention has found that devices that protect the fuel filter by diverting return fuel from the unfiltered side of the fuel filter to the filtered side of the filter when a predetermined pressure differential is exceeded, do not currently appear to exist. Fuel returned to the unfiltered side of the filter is common in newer diesel fuel delivery systems, because of the previously mentioned de-waxing advantage, but also because the returned fuel can sometimes contain wear debris from inside the fuel injection pump. However, under certain conditions to avoid failure of another component in the system, it maybe desirable temporarily divert return fuel to the filtered side of the filter. This could be used for instance, to control high filter differential pressure, that may burst the filter. This feature could also be used for a fuel system that occasionally has return flow considerably exceeding the primary pump output, as well as the flow capability of the filter.

SUMMARY OF THE INVENTION

An object of the present invention is to provide a novel fuel system for regulating fuel pressure and temperature in a fuel delivery system for a fuel injection system on a combustion engine which overcomes the disadvantages of prior art approaches. In one particular aspect of the invention, the fuel system includes a pressure regulator valve adapted to communicate with a fuel supply line in a parallel relationship with a fuel filter. The pressure regulator valve controls fuel supply pressure by sensing fuel pressure on the filtered side of the filter and relieves excess fuel from the unfiltered side of the filter. The system may further include a diverter valve responsive to the fuel temperature. The diverter valve is adapted to communicate between the fuel supply line and a fuel return line. The diverter valve selectively diverts return fuel flow to the fuel supply line based on fuel temperature. The diverter valve may be pilot operated.

In a preferred embodiment the pressure regulator valve communicates with the diverter valve such that the pressure regulator valve may override the selective diverting performed by the diverter valve based on the fuel pressure in the fuel supply line.

Also, in a preferred embodiment, the fuel system may further include a pressure relief diverter valve communicating with the diverter valve and with both the filtered and unfiltered sides of the fuel supply line. The pressure relief diverter valve is responsive to the fuel pressure differential across the filter and selectively diverts fuel from the return line to the filtered or unfiltered side of the filter based on this pressure differential.

To decrease the complexity of the system, the pressure regulator, diverter valve and the pressure relief diverter valve may be housed in a single valve assembly.

An advantage of the present invention is that required fuel pressure is provided.

Another more specific advantage of the present invention is that returned fuel is recirculated back to the fuel supply line during low fuel pressure conditions.

Another, more specific, advantage of the present invention is that heated fuel is used to de-wax the fuel filter, thereby obviating the need for electric or other external fuel heaters.

Yet another advantage of the present invention is that cavitation at low pressure as well as damage to the fuel system at high pressure and temperature are reduced.

Another, more specific, advantage of the present invention is that the fuel filter is protected from excessive fuel pressure differential.

Other objects, features and advantages of the present invention will be readily appreciated by the reader of this specification.

BRIEF DESCRIPTION OF THE DRAWINGS

The invention will now be described by way of example with reference to the accompanying drawings, in which.

DETAILED DESCRIPTION OF THE PREFERRED EMBODIMENTS

Figure 1:
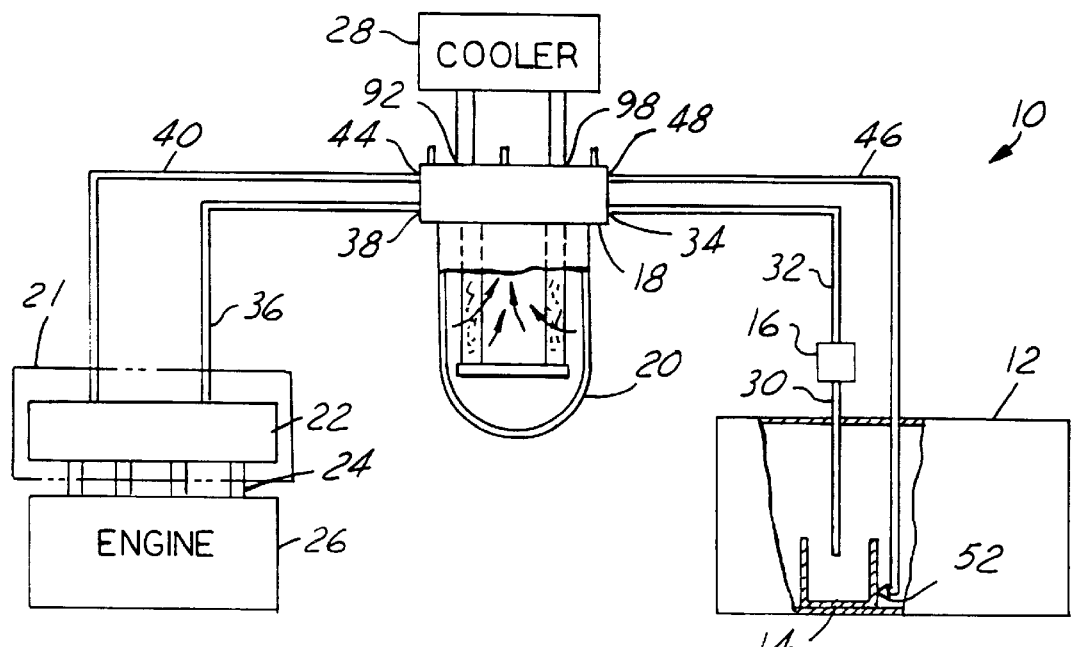
FIG. 1 is a schematic representation of a fuel system according to the present invention.

Fuel delivery system 10, shown in FIG. 1, includes fuel tank 12, having fuel tank delivery module 14 disposed therein, primary fuel pump 16, filter head valve assembly 18, with filter 20 attached thereto which thereby defines a boundary between filtered and unfiltered sides and fuel injection system 21, which includes fuel injection pump 22 and fuel injectors 24, communicating with engine 26. Fuel injection pump 22 may be an in-line plunger type pump, a distributor pump, a unit injector system, a common rail injection system or any other type, as desired. Fuel cooler 28 may also be included in fuel system 10. Fuel supply line 30 communicates between an optional fuel delivery module 14, which may include a strainer (not shown), and primary pump 16. Fuel supply line 32 communicates between the outlet of primary pump 16 and supply inlet port 34 of filter head valve assembly 18. Fuel supply line 36 communicates between supply outlet port 38 of filter head valve assembly 18 and injection pump 22. Accordingly, fuel may be delivered to injectors 24 to supply fuel to engine 26.

Figure 2:
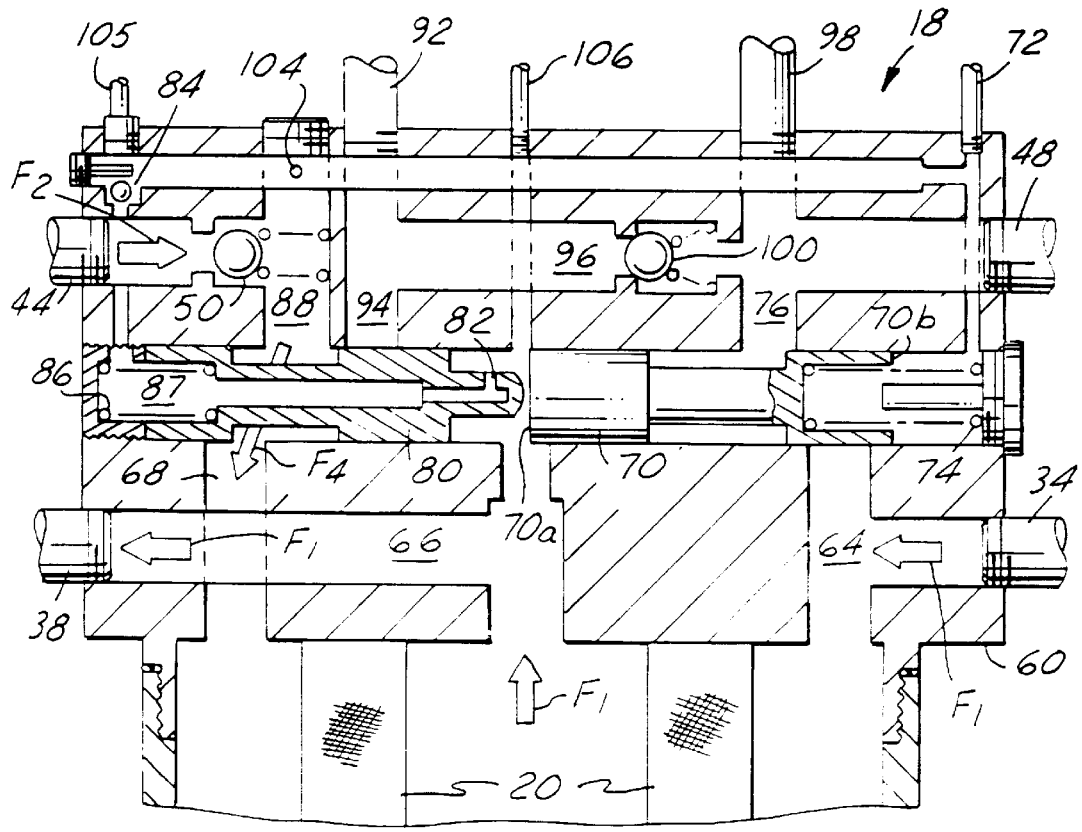
FIGS. 2–5 are cross-sectional representations of a valve used in the fuel system according to the present invention; and, FIGS. 6–8 are cross-sectional representations of alternative embodiments of a valve used in the fuel system according to the present invention.
Figure 3:
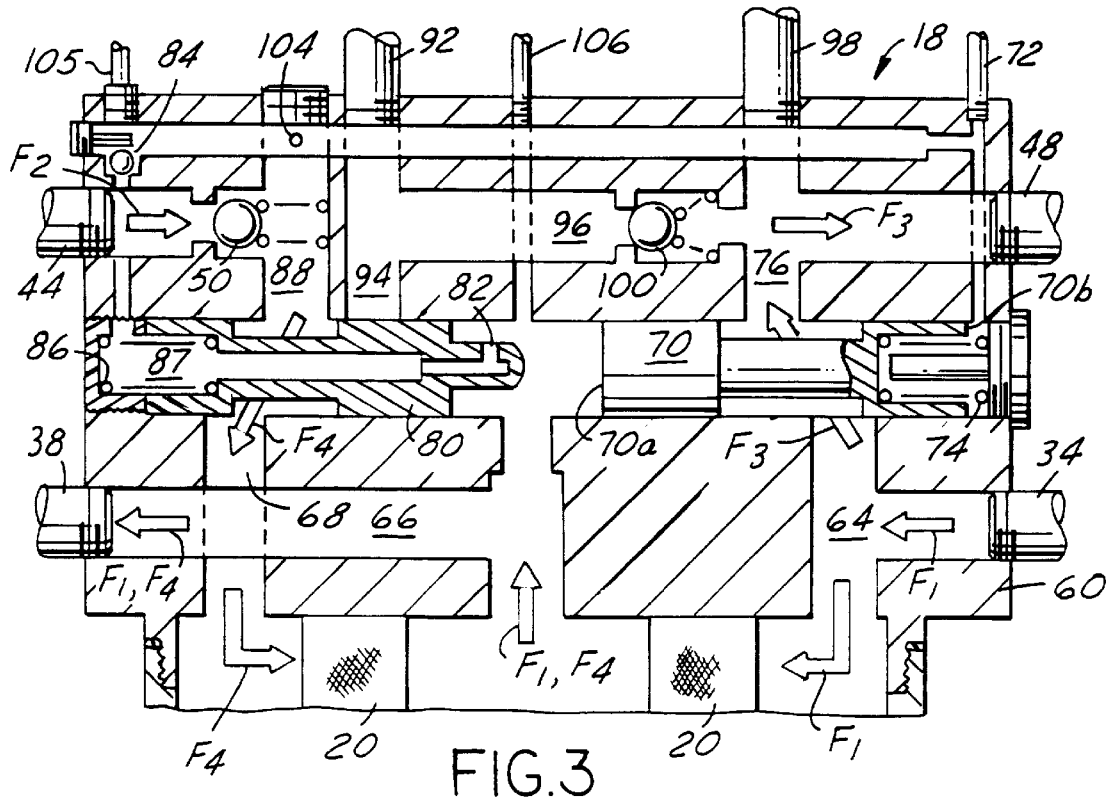

Fuel return line 40 communicates between fuel injection pump 22 and return inlet port 44 of filter head valve assembly 18, and fuel return line 46 communicates between return outlet port 48 and fuel tank 12. Check valve 50 (which is shown located within filter head valve assembly 18 in FIG. 2) communicates with return fuel line 40 to prevent back flow, for example, when primary fuel pump 16 is operating, but engine 26 is not rotating. Check valve 50 may not be necessary if a check valve is included in the outlet of fuel injection pump 22. Fuel may be returned to fuel tank 12 for a number of reasons, including, but not limited to, air purging and, more importantly, cooling of the fuel. In addition, return fuel may be routed through an optional fuel cooler 28. Jet pump 52 may also be provided, which is powered with return fuel via communication with return fuel line 46, to keep fuel delivery module 14 full with fuel under, for example, adverse gradient and transient vehicle operating conditions.

According to the present invention, filter head valve assembly 18 performs the functions of directing fuel flow through filter 20, as well as fuel pressure and temperature regulation. Referring now to FIGS. 2–5, filter head valve assembly 18 includes housing 60 with filter 20 attached thereto. For the sake of clarity, only a portion of filter 20 is shown. Also, for clarity, filter head valve assembly 18 is shown in cross section, with all components and ports shown substantially through the same plane. Those skilled in the art will recognize in view of this disclosure that the components and ports shown may be physically located on different planes. As shown by fuel flow arrows $F_1$, fuel flows through housing 60 from fuel supply inlet 34, through port 64, filter 20, port 66 and out supply outlet port 38. Return fuel, indicated as fuel flow arrows $F_2$, flows from return inlet port 44 and is selectively routed to return outlet port 48, or to unfiltered return port 68, as will be further described hereinafter.

Filter head valve assembly 18 includes fuel pressure regulating spool valve 70 disposed within housing 60 and arranged in a parallel relationship with filter 20. Pressure valve 70 senses fuel pressure on the filtered side of filter 20 and relieves excess fuel pressure from the unfiltered side of filter 20. Accordingly, end 70a of pressure valve 70 is exposed to fuel pressure on the filtered side of filter 20 via port 66 and end 70b is exposed to ambient pressure via ambient pressure port 72. When the filtered fuel pressure reaches a level that exceeds the predetermined load of spring 74, pressure valve 70 will move toward spring 74 (see FIG. 3), allowing unfiltered fuel port 64 to communicate with return outlet port 48 via spill port 76, thereby relieving excess fuel pressure, as shown by arrow $F_3$. Pressure valve 70 therefore accurately controls filtered side fuel pressure while relieving excess fuel pressure from the unfiltered side of filter 20, irrespective of the pressure drop across filter 20. Those skilled in the art will recognize in view of this disclosure that, rather than expose end 70b of valve 70 to port 72, hole 77 (see FIG. 6) may be provided in valve 70 to allow valve 70 to move.

Continuing with reference to FIGS. 2–5, according to the present invention, filter head valve assembly 18 further includes pilot operated diverter valve 80, which moves in response to the fuel temperature, disposed within housing 60. Diverter valve 80 includes control orifice 82, which allows communication between port 66 and temperature sensitive pilot valve 84, and bias spring 86 housed within bias spring chamber 87. Diverter valve 80 communicates with return inlet 44, via port 88, unfiltered side of filter 20, via port 68, cooler outlet port 92, via port 94, and return outlet port 48, via port 96. It should be noted that cooler inlet port 98 may be formed in housing 60, which communicates with port 96 and return outlet port 48, should a cooler be used in system 10. Relief valve 100 may be provided within port 96 to bypass fuel cooler 28 in the event that fuel cooler 28 chokes due to wax build-up at cold temperatures. Temperature sensitive pilot valve 84, which partially controls the operation of diverter valve 80, may be a bi-metal type valve (as shown), a wax capsule type valve, a solenoid type valve with remote sensing and control by an electronic engine control module (not shown), or any other type of temperature sensitive valve.

When engine 26 is first started and the fuel is cold, cold filtered fuel travels through orifice 82, through diverter valve 80 and into bias spring chamber 87, which is vented by pilot valve 84 to ambient pressure port 72. The size of the orifice created by pilot valve 84 when the fuel is cold is larger than control orifice 82. This causes a pressure drop across diverter valve 80 causing it to compress bias spring 86, thereby connecting ports 88 and 68 (see FIG. 3), which allows fuel to flow from return inlet port 44, through check valve 50, to the unfiltered side of filter 20. Because injection pump 22 adds heat to this cold fuel, with diverter valve 80 in the position shown in FIG. 3, heated return fuel is diverted to the unfiltered side of filter 20, as shown by fuel flow arrows $F_4$ (see FIG. 3). Thus, any wax buildup on the unfiltered side of filter 20 is melted and further wax formation is reduced.

Figure 4:
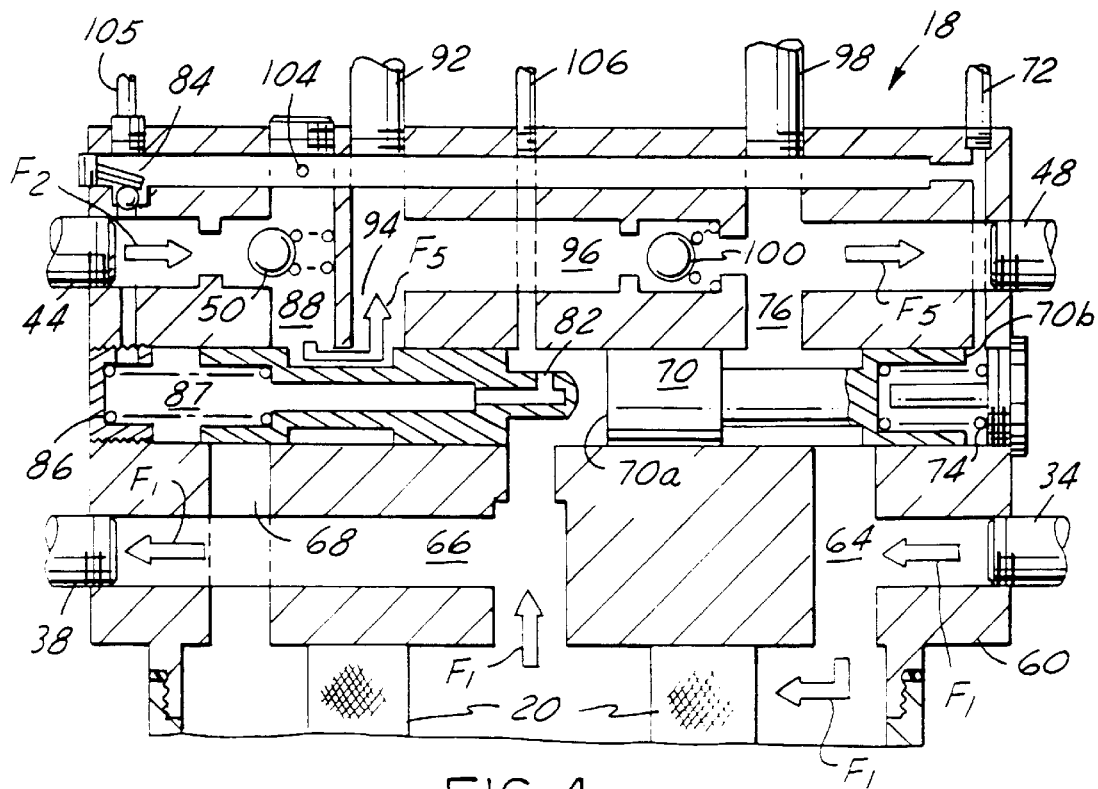
Figure 5:
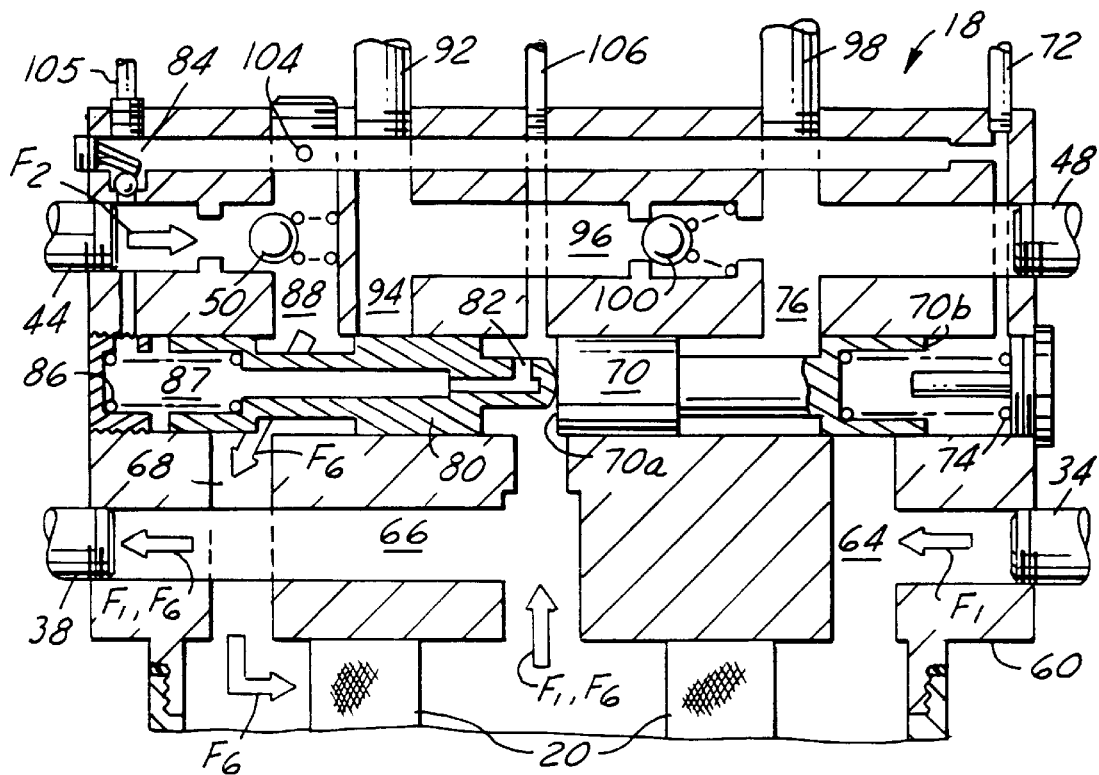

As engine 26 warms up and injection pump 22 generates heat, return fuel will continue to be diverted to the unfiltered side of filter 20, as described above. The fuel is then blended with incoming fuel from supply inlet port 34 from the primary pump 16 and together passes through filter 20. Some of this fuel will flow through control orifice 82 and pass through the center of diverter valve 80, as described above. As best shown in FIG. 4, once the temperature of the fuel is above a predetermined value, as determined by the temperature sensitive bi-metallic pilot valve 84 in this example, pilot valve 84 will close. As pilot valve 84 closes, the pressure across diverter valve 80 will balance, causing bias spring 86 to push diverter valve 80 toward fuel pressure regulating valve 70, thereby connecting return fuel port 88 with port 94. The hot fuel returned from injection pump 22 is therefore directed to fuel cooler 26 (see FIG. 1) via cooler outlet 92, or directly back to fuel tank 12 via return outlet port 48, as desired, as shown by fuel flow arrow $F_5$. This re-directing of heated fuel causes heat to be transferred from the fuel to fuel cooler 26 or fuel tank 12, which may act as a short term heat sink, as desired.

In the event that fuel flow from injection pump 22, through filter head valve assembly 18 (via ports 44 and 48) exceeds the flow capability of primary pump 16 (either due to design or temporary or permanent failure of some supporting system component), then a slight loss in regulated pressure may occur, which will cause pressure valve 70 to close communication between port 64 and port 76. As pressure valve 70 moves toward diverter valve 80 (see FIG. 5), pressure valve 70 will contact valve 80, physically pushing diverter valve 80 toward bias spring 86. This reduces communication between ports 88 and 94 and allows communication between ports 88 and 68, as shown by fuel flow arrow $F_6$. Thus, return fuel flow to tank 12 is reduced until primary pump 16 can support the modified flow (see FIG. 5). By communicating in this manner, the combined action of pressure valve 70 and diverter valve 80 maintain desired filtered side fuel pressure in preference to maximum return fuel for cooling. That is, temperature regulation is overridden in an effort to maintain pressure regulation.

It is common in fuel systems to provide a continuous bleed of fuel, from the unfiltered side of the system, to an ambient pressure return to the fuel tank in order to purge any air in the system. Accordingly, in a preferred embodiment, orifice 104 communicates between port 88 and vent 72. Further, if jet pump 52 is used, a back pressure will be generated in port 76. Thus, it may further be necessary to provide filter head valve assembly 18 with ambient pressure port 72 coupled to a return line to tank 14. Fuel may thus flow through this line at low flow and ambient pressure. In addition, in a preferred embodiment, it may be desirable to provide filter head valve assembly 18 with port 105 for injector back-leak, which is common in most fuel injection systems. Further, filter head valve assembly 18 may be provided with port 106 for delivering filtered fuel to other vehicle systems, such as a diesel fuel fired passenger compartment heater.

Figure 6:
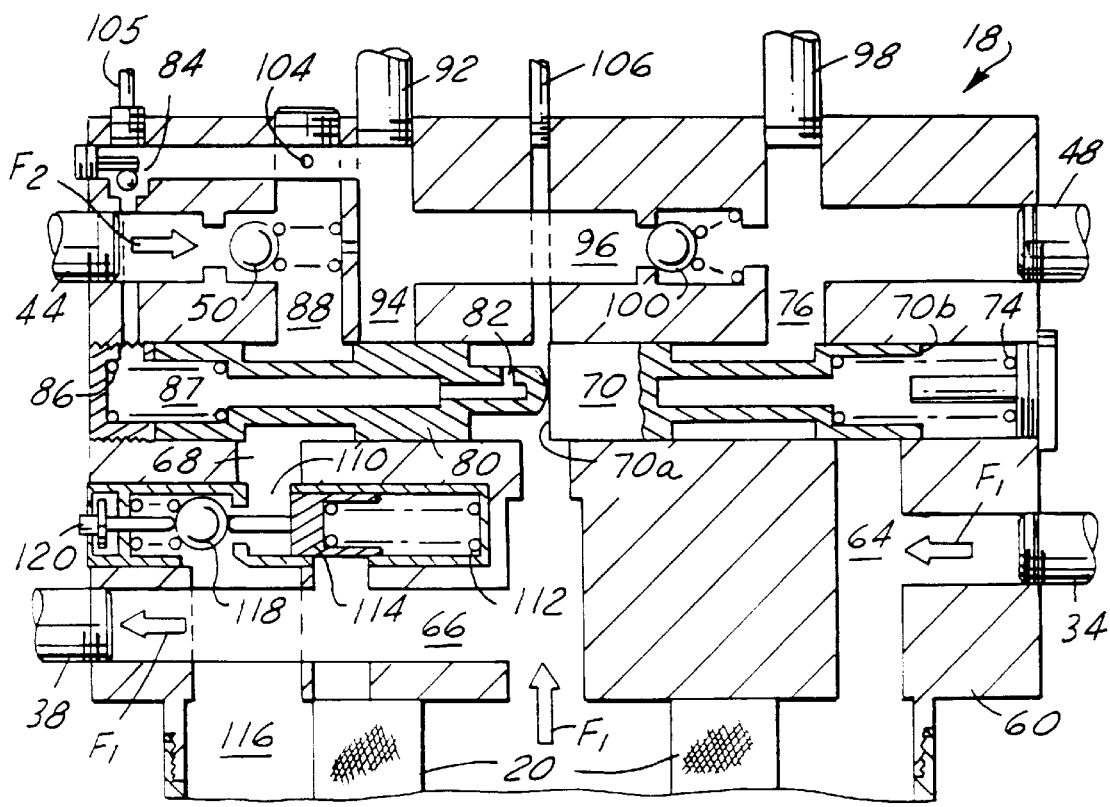

In a preferred embodiment, as shown in FIG. 6, filter head valve assembly 18 further includes spring loaded pressure relief diverting valve assembly 110 disposed within housing 60 to reduce damage to filter 20 resulting from excessive filter pressure differential such as, for example, in the case of a clogged filter. Valve assembly 110 communicates between filtered and unfiltered fuel via ports 66 and 68, respectively. Spring 112 holds valve portion 114 toward the unfiltered side until a pre-determined pressure differential is exceeded. When this differential is exceeded, valve portion 114 overcomes the force of spring 112 and moves toward the filtered side, thereby diverting return flow from port 68 to port 66 rather than from port 68 to port 116. This prevents an excessive pressure drop across filter 20, thereby avoiding failure of filter 20. Valve assembly 110 also includes check valve 118, which is held open by an extension on valve portion 114 while the filter head valve assembly 18 is in the unfiltered side return mode, as shown. Check valve 118 closes when valve portion 114 moves to filtered side recirculation mode, thereby preventing unfiltered fuel from backflowing from port 116 to the filtered side of filter 20 at port 66. The movement of this valve could also operate switch 120, thereby warning the vehicle operator of the clogged filter condition.

Figure 7:
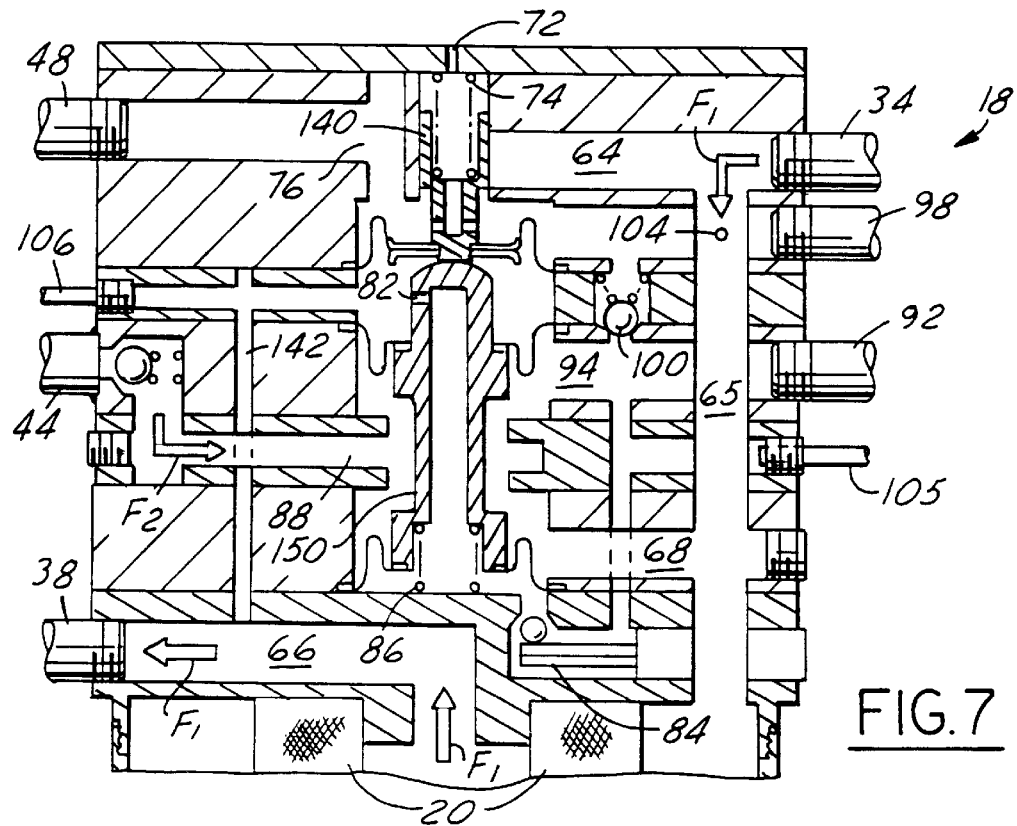
Figure 8:
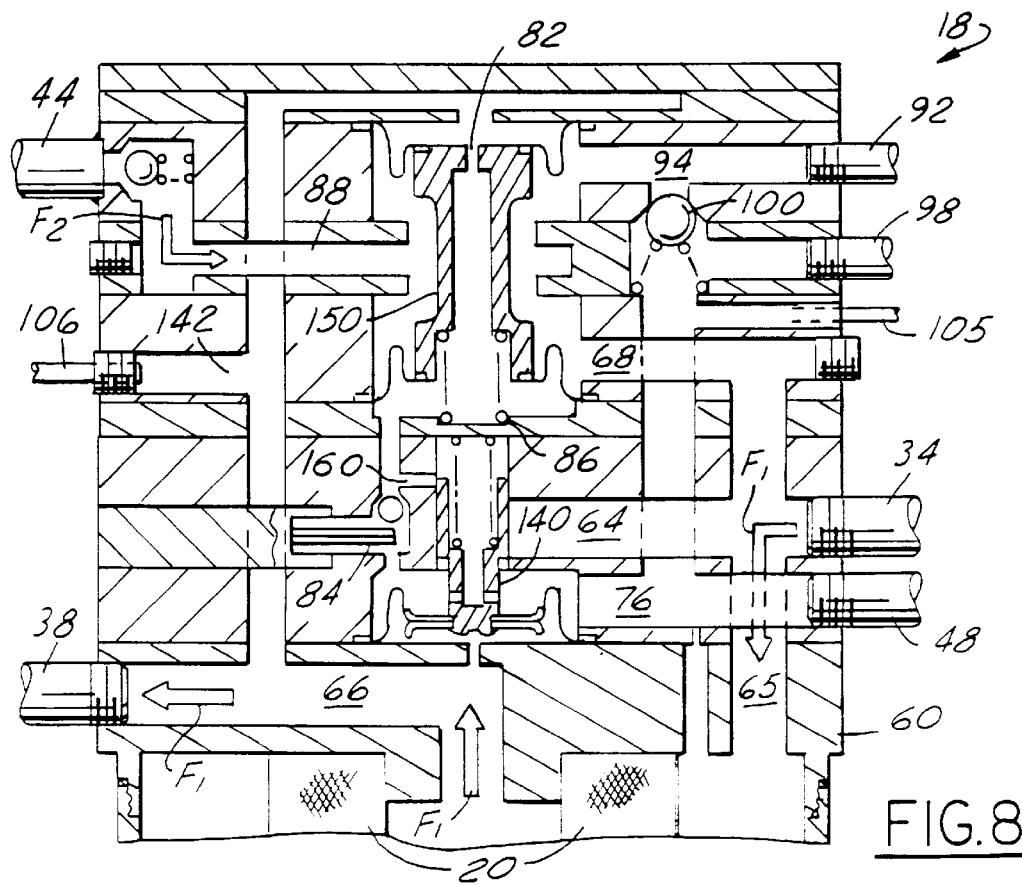

Pressure and diverter valves 70, 80 described herein are spool valves. However, close clearances on the spool valves required to separate the filtered fuel from the unfiltered fuel may present problems when handling relatively dirty or relatively cold fuel (colder than the cloud point), unless a primary coarse filter (not shown) is incorporated in system 10. Therefore, diaphragm valves, as shown in FIGS. 7 and 8, for example, may be more desirable. It should be noted however, that the portion of the pressure valve 70 that separates supply fuel from return fuel may have adequate clearances to permit some dirt and fuel wax to pass without affecting operation.

Referring now to FIGS. 7 and 8, alternative embodiments according to the present invention will now be described. For the sake of clarity, components having functions similar to the components described with reference to FIGS. 1–6 will have the same reference numerals. Further, while the physical configuration of the invention shown in FIGS. 7 and 8 may be different from that shown in FIGS. 2–6, the function of filter head valve assembly 18 is the same. In FIG. 7, fuel pressure regulating diaphragm valve 140 is disposed within housing 60 and replaces fuel pressure regulating spool valve 70 shown in FIGS. 2–6. Pressure valve 140 senses fuel pressure on the filtered side of filter 20 and relieves excess fuel pressure from the unfiltered side of filter 20. In this embodiment, filter head valve assembly 18 also includes pilot operated diverter diaphragm valve 150, which replaces diverter valve 80 described with reference to FIGS. 2–6, disposed within housing 60.

Referring now in particular to FIG. 8, rather than provide direct mechanical communication between pressure diaphragm valve 140 and diverter diaphragm valve 150 (as shown in FIG. 7) so that maintaining pressure regulation may override maintaining temperature regulation, hydraulic communication between pressure diaphragm valve 140 and diverter diaphragm valve 150 is provided. That is, as filtered side pressure decreases, pressure diaphragm valve 140 uncovers pilot valve bypass port 160 to allow fuel to pass through valve 140 to vent to port 76. This recreates the pressure differential across diverter diaphragm valve 150, causing it to move toward the bias spring 86, such that return fuel may flow to port 68 while preventing flow to port 94. This hydraulic means of communication, as with mechanical communication previously mentioned, maintains filtered side fuel pressure in preference to maximum return to tank fuel flow for cooling.

While the best mode for carrying out the invention has been described in detail, those skilled in the art in which this invention relates will recognize various alternative designs and embodiments, including those mentioned above, in practicing the invention that has been defined by the following claims. For example, although it is desirable to incorporate all of the foregoing fuel pressure and temperature management components within filter head assembly 18, these components may be located individually anywhere in fuel system 10, provided, however, that the components communicate with each other according to the aforementioned description.

I claim:

1. A fuel control system for regulating fuel in a fuel delivery system for a fuel injection system on a combustion engine, the fuel delivery system having a fuel tank, a fuel supply line, a fuel return line for returning excess fuel to the fuel tank, a fuel filter for filtering fuel flowing through the supply line, with the filter thereby defining a boundary between a filtered side and an unfiltered side, and a fuel pump communicating with the fuel tank and the fuel injection system for pumping fuel from the tank, through the supply line and filter, to the engine, with said control system comprising:

a pressure regulator valve adapted to communicate with the fuel supply line in a parallel relationship with the filter, with said pressure regulator valve controlling fuel supply pressure by sensing fuel pressure on the filtered side of the filter and relieving excess fuel from the unfiltered side of the filter; and a diverter valve communicating with said pressure regulator and being responsive to fuel temperature, with said diverter valve being adapted to communicate between the fuel supply line and the fuel return line, with said diverter valve selectively diverting return fuel flow to the fuel supply line or fuel return line based on fuel temperature, with said pressure regulator valve overriding said selective diverting performed by said diverter valve based on the fuel pressure in the fuel supply line on the filtered side of the filter.

2. A fuel control system according to claim 1 wherein said diverter valve is pilot operated.

3. A fuel delivery system for a fuel injection system on an internal combustion engine comprising:

a fuel tank;

a fuel supply line communicating with said fuel tank;

a fuel filter communicating with said fuel supply line for filtering fuel flowing therethrough, with the filter thereby defining a boundary between a filtered side and an unfiltered side;

a fuel pump communicating with said fuel supply line between said fuel tank and the engine for pumping fuel from said tank, through said supply line and said filter, to the fuel injection system;

a fuel return line communicating between the fuel injection system and said fuel tank for returning excess fuel to said fuel tank;

a pressure regulator valve communicating with said fuel supply line, with said pressure regulator valve controlling fuel supply pressure by sensing fuel pressure on said filtered side of said filter and relieving excess fuel from said unfiltered side of said filter; and, a diverter valve communicating between said fuel supply line and said fuel return line, with said diverter valve being responsive to fuel temperature and selectively diverting return fuel flow from said return line to said fuel supply line or said tank based on fuel temperature.

4. A fuel delivery system according to claim 3 wherein said pressure regulator valve communicates with said diverter valve, with said pressure regulator valve overriding said selective diverting performed by said diverter valve based on the fuel pressure in said fuel supply line on the filtered side of the filter.

5. A fuel delivery system according to claim 4 further comprising a pressure relief diverter valve communicating with said diverter valve and with both said filtered and unfiltered sides of said fuel supply line, with said pressure relief diverter valve being responsive to a fuel pressure differential between said filtered and unfiltered sides of said fuel filter and selectively diverting fuel from said return line to said filtered or unfiltered side of said filter.

6. A fuel delivery system according to claim 3 wherein said diverter valve is pilot operated.

7. A fuel delivery system according to claim 4 wherein said communication between said pressure regulator valve and said diverter valve comprises mechanical communication.

8. A fuel delivery system according to claim 4 wherein said communication between said pressure regulator valve and said diverter valve comprises hydraulic communication.

9. A fuel control valve for regulating fuel pressure and temperature in a fuel delivery system for an internal combustion engine, the fuel delivery system having a fuel tank, a fuel supply line, a fuel filter for filtering fuel flowing through the supply line, with the filter thereby defining a boundary between a filtered side and an unfiltered side, a fuel injection system, a fuel pump communicating with the fuel tank and the engine for pumping fuel from the tank, through the supply line and filter, to the fuel injection system, and a fuel return line for returning excess fuel to the fuel tank, with said control valve comprising:

a housing having a fuel supply inlet, a fuel supply outlet and a supply port therebetween, with said supply inlet and supply outlet being adapted to communicate with the fuel supply line such that supply fuel passes through said supply port, and a fuel return inlet, a fuel return outlet and a return port therebetween, with said return inlet and return outlet being adapted to communicate with the fuel return line such that return fuel may pass through said return port;

a pressure regulator valve disposed within said housing and communicating with said fuel supply inlet and said fuel return outlet, with said pressure regulator valve controlling fuel supply pressure sensing fuel pressure on the filtered side of the filter and relieving excess fuel from the unfiltered side of the filter by allowing fuel to flow from said fuel supply inlet to said fuel supply outlet; and, a diverter valve disposed within said housing and communicating between said fuel return inlet and said fuel supply outlet, with said diverter valve being responsive to fuel temperature and selectively diverting return fuel flow from said fuel return inlet to said fuel supply outlet or said fuel return outlet based on fuel temperature.

10. A fuel control valve according to claim 9 wherein said pressure regulator valve communicates with said diverter valve, with said pressure regulator valve overriding said selective diverting performed by said diverter valve based on the fuel pressure in said fuel supply port on the filtered side of the filter.

11. A fuel control valve according to claim 10 further comprising a pressure relief diverter valve disposed within said housing and communicating with said diverter valve and said fuel supply port at both the filtered and unfiltered sides of the filter, with said pressure relief diverter valve being responsive to the fuel pressure differential between the filtered and unfiltered sides of the fuel filter and selectively diverting fuel from said return inlet to said supply port on the filtered or unfiltered side of the filter.

12. A fuel control valve according to claim 10 wherein said diverter valve is pilot operated.

13. A fuel control valve according to claim 10 wherein said communication between said pressure regulator valve and said diverter valve comprises mechanical communication.

14. A fuel control valve according to claim 10 wherein said communication between said pressure regulator valve and said diverter valve comprises hydraulic communication.

15. A fuel control valve according to claim 9 wherein one of said pressure regulator valve and said diverter valve comprises a spool valve.

16. A fuel control valve according to claim 9 wherein one of said pressure regulator valve and said diverter valve comprises a diaphragm valve.

17. A fuel control valve according to claim 9 wherein said housing is adapted to connect with the filter such that the filter is communicatable with said supply port between said fuel supply inlet and said fuel supply outlet.

* * * * *